United States Patent [19]

Herscovici et al.

[11] Patent Number: 4,758,473
[45] Date of Patent: Jul. 19, 1988

[54] STABLE CARBON-PLASTIC ELECTRODES AND METHOD OF PREPARATION THEREOF

[75] Inventors: Calman Herscovici, Chappaqua, N.Y.; Anthony Leo, Danbury; Allen Charkey, Brookfield, both of Conn.

[73] Assignee: Electric Power Research Institute, Inc., Palo Alto, Calif.

[21] Appl. No.: 933,466

[22] Filed: Nov. 20, 1986

[51] Int. Cl.$^4$ .................. B32B 9/00; C04B 35/00; H01M 4/62; H01M 6/48

[52] U.S. Cl. .................. 428/408; 264/105; 429/210; 429/217; 429/229; 429/232; 252/510; 252/511

[58] Field of Search .............. 428/408; 204/254, 268, 204/294; 429/210, 229, 232, 217; 264/105; 252/510, 511

[56] References Cited

U.S. PATENT DOCUMENTS

| | | | |
|---|---|---|---|
| 3,565,694 | 2/1971 | Chireau | 429/210 |
| 3,589,942 | 6/1971 | Leitz, Jr. et al. | 429/26 |
| 4,098,967 | 7/1978 | Biddick et al. | 429/234 X |
| 4,124,747 | 11/1978 | Murer et al. | 429/210 |
| 4,125,680 | 11/1978 | Shropshire et al. | 429/154 X |
| 4,214,969 | 7/1980 | Lawrance | 204/263 X |
| 4,294,893 | 11/1981 | Iemmi et al. | 204/294 X |
| 4,339,322 | 7/1982 | Balko et al. | 204/255 |
| 4,482,614 | 11/1984 | Zito, Jr. | 429/101 X |

FOREIGN PATENT DOCUMENTS 439917 1/1936 United Kingdom .

Primary Examiner—John E. Kittle
Assistant Examiner—Susan S. Rucker
Attorney, Agent, or Firm—Flehr, Hohbach, Test, Albritton & Herbert

[57] ABSTRACT

Novel bipolar electrodes for electrochemical cells and methods for making same are provided. The bipolar electrodes comprise a pressure-molded composite of heat-treated graphite particles having a particle size distribution of 0 to 45 μm and thermoplastic resin particles. The graphite and resin in the composite are in a weight ratio of from 1:5 to 1:1 and are formed by pressure-molding at 400 kg/cm$^2$ or higher at 190° C.

13 Claims, 3 Drawing Sheets

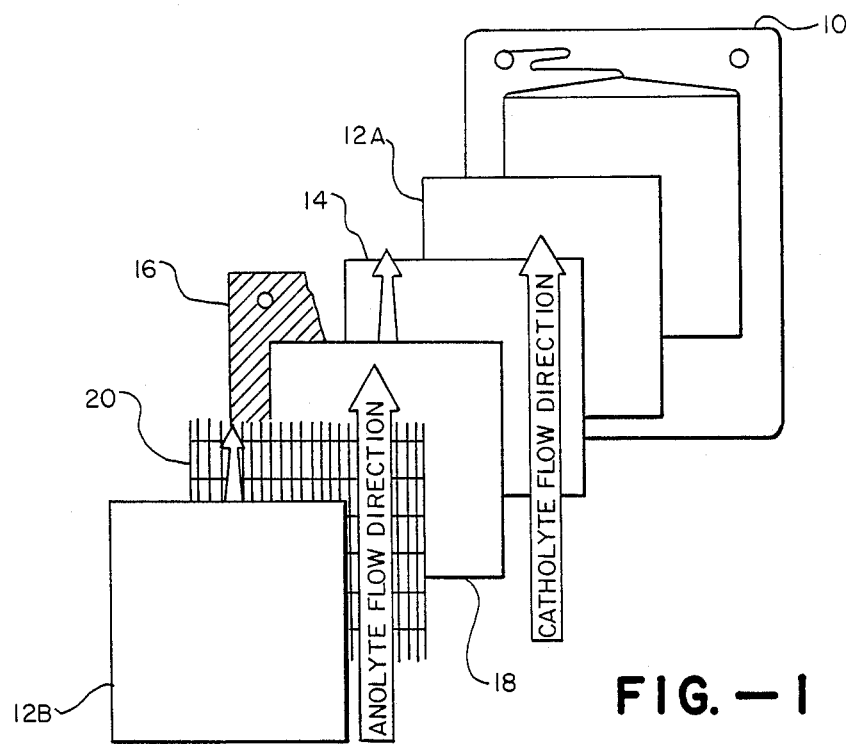
FIG.—1
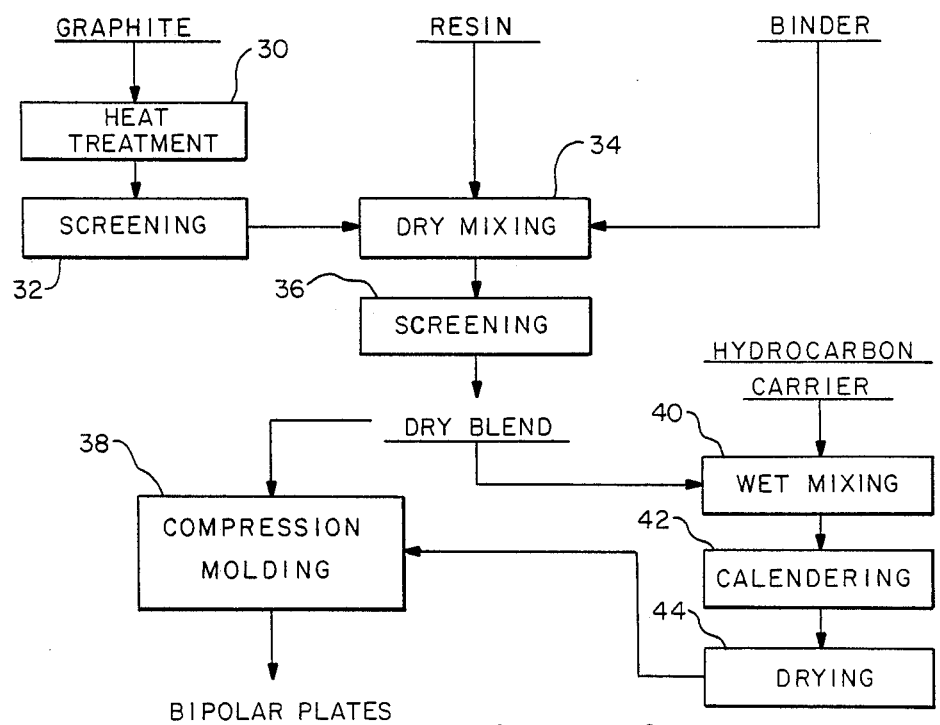
FIG.—4

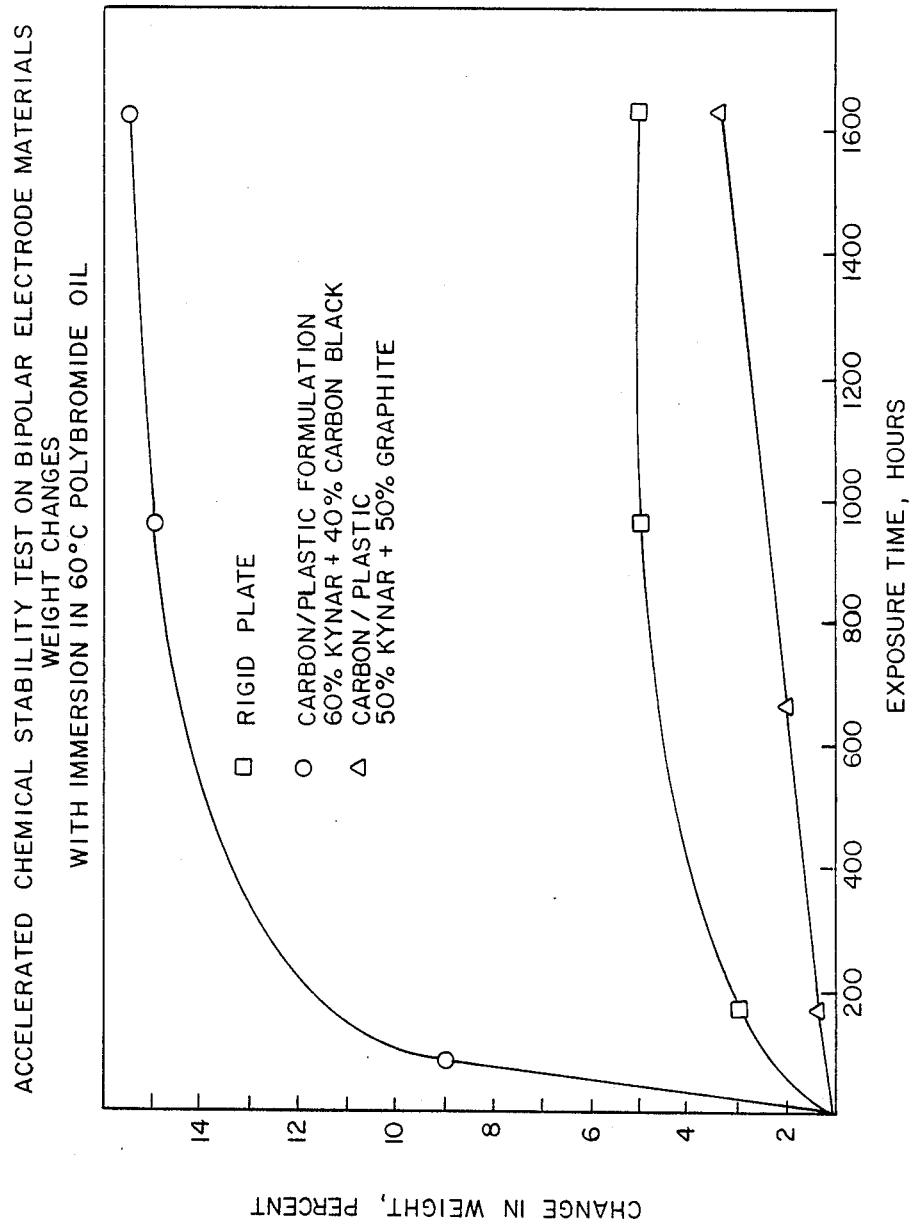
FIG.—2

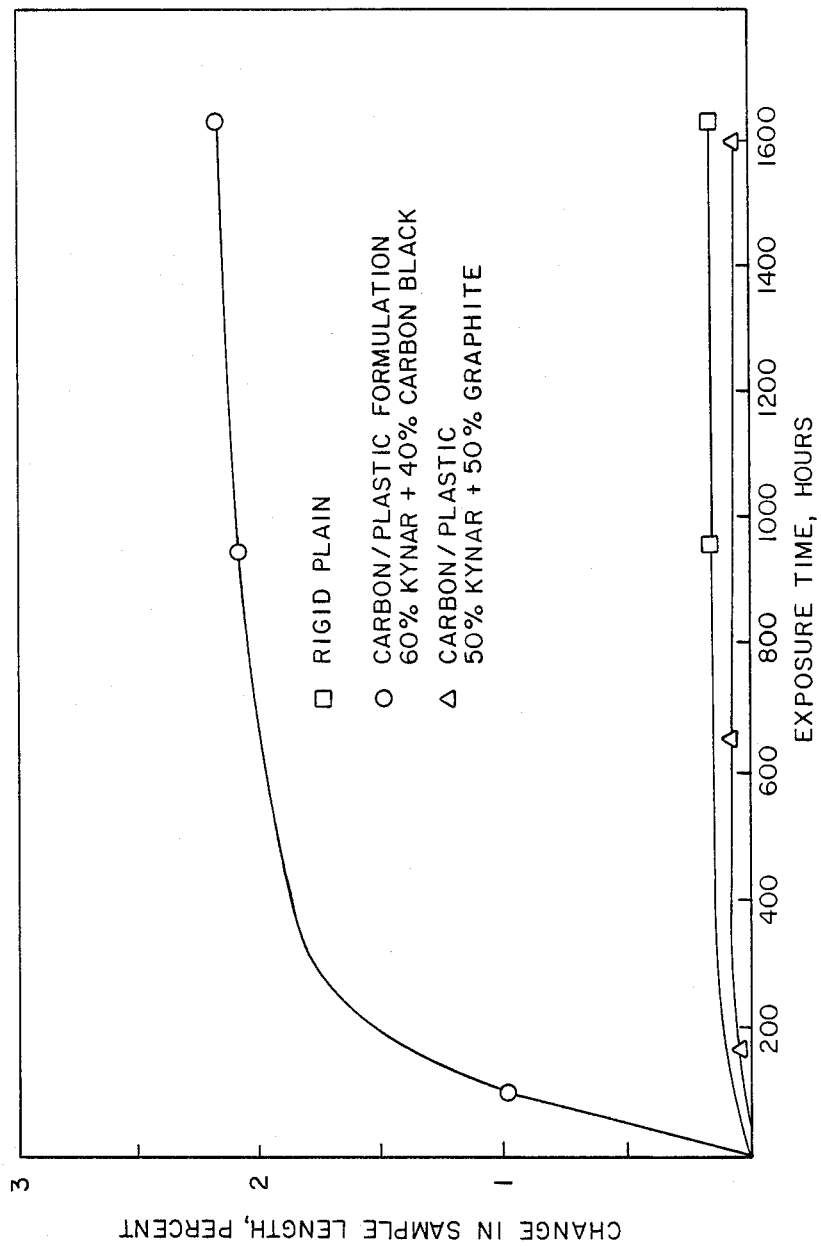

STABLE CARBON-PLASTIC ELECTRODES AND METHOD OF PREPARATION THEREOF

The present invention is directed to pressure molded bipolar electrodes for electrochemical cells, and more particularly for zinc bromide electrochemical cells.

BACKGROUND OF THE INVENTION

There has been great interest in the development of a zinc bromide battery as an energy storage device because of the potential for its simplicity of design, high theoretical voltage, and low cost of reactants. In such a battery the energy is stored by electrolyzing an aqueous zinc-bromide cell on charge to form zinc metal and bromine liquid. During charge bromine is evolved at the cathode and dissolved in the electrolyte while zinc metal is deposited on the anode. On discharge the two reactants are consumed to form zinc bromide.

An exemplary zinc bromide battery consists of a stack of flow frame assemblies wherein a carbon bipolar electrode is bonded into each frame. The flow channels in the frames direct electrolyte past the anode and cathode side of each electrode. One side of each electrode is usually a flat surface on which zinc is deposited and consumed while the other side of the electrode may comprise a carbon felt to support the bromine evolution and consumption reactions. A porous separator is maintained between the positive and negative sides of the adjacent electrodes to prevent bromine from diffusing from the positive electrolyte to the negative electrolyte, each of which is maintained in a separate flow system.

During charge of the battery a method of storage is required to remove generated bromine from the catholyte, to avoid increase in bromine concentration to levels of self-discharge and corrosion of cell components. Thus, bromine is stored as a complex with a quaternary ammonium bromide salt so that up to four bromine molecules can reversibly complex with the salt. The unbrominated quaternary salt is soluble in aqueous electrolyte while the polybromide complex is insoluble and separates out in a heavier oil-like phase. The organic complexing agent flows in a separate flow loop and is not pumped through the cell stack. Contact between the catholyte and complexing agent is accomplished by dispersing the complexing agent into droplets in a mixer external to the cell stack, thus increasing the area for bromine transfer between the two phases. An exemplary zinc bromide battery stack utilizing this system is disclosed in U.S. Pat. No. 4,162,351.

It is, however, desirable to scale up current zinc bromide technology to meet costs and performance requirements on a large scale, as for example for a power utility load leveling mission. To meet these requirements it is important to improve not only the efficiency of the design of the battery but also to improve the system lifetime, and in particular the lifetime of components which are subjected to particularly stressful conditions. One of these components is the bipolar electrode. The commonly used component for this purpose is a vitreous carbon electrode which, particularly when scaled to the sizes required to meet industrial uses, is brittle, difficult to bond into flow frames and overall is one of the most expensive components in the cell stack. In addition, chemical stability is an issue which must be addressed in order to improve the lifetime of this component.

Bipolar current collector-separators for electrochemical cells containing graphite and thermoplastic fluoropolymers are disclosed in Pat. Nos. 4,214,969 and 4,339,332. A bipolar plate substrate for electrochemical cell containing glassy carbon and a plastic such as polyvinylidene fluoride homopolymer is disclosed in Pat. No. 4,098,967. The above patents, however, are not directed to bipolar electrodes which meet the requirements of low cost, durability, and good electrical performance in a zinc bromide battery for large industrial application.

It is therefore an object of the present invention to provide novel bipolar electrodes which have improved stability to a stringent electrochemical cell environment, particularly to a zinc-bromide cell environment.

It is a further object of the present invention to provide novel bipolar electrodes which may be scaled up to large industrial applications while maintaining or improving physical strength, chemical stability to electrochemical cell environment, electrical performance, and component longevity.

It is another object of the present invention to provide a method for manufacturing improved bipolar electrodes for electrochemical cells.

It is yet another object of the present invention to provide a novel combination of a bipolar electrode and carbon felt for use in electrochemical cells. These and other objects will become apparent from the following description and appended claims.

SUMMARY OF THE INVENTION

Novel bipolar electrode elements for electrochemical cells are provided as well as methods for producing same. The bipolar elements comprise a pressure-molded composite of heat-treated electrically conductive graphite particles having a particle size distribution (before molding) of 0 to 45 $\mu$m the graphite being heat-treated at a temperature of at least 800° C. for 2 hours prior to forming the composite; and thermoplastic resin particles, the graphite and resin in the composite being in a weight ratio of from 1:5 to 1:1. The composite is characterized by less than 4.0% weight loss and less than 0.1% dimensional increase in length upon immersion at 60° C. into polybromide oil for 1600 hours. The composite is formed by pressure-molding a mixture comprising the graphite and resin at 400 kg/cm² at 190° C.

A novel assembly is also provided comprising the above described bipolar current collecting element and a composite carbon felt held in interfacial contact with each other with an adhesive.

BRIEF DESCRIPTION OF THE DRAWINGS

In the accompanying figures:

FIG. 1 is a battery design shown schematically incorporating the bipolar electrodes according to the present invention.

FIG. 2 is a graph comparing the chemical stability of bipolar electrode materials according to the present invention to a conventional rigid graphite plate and a non-graphitic carbon/plastic formulation, with respect to change in weight.

FIG. 3 is a graph comparing the chemical stability of a bipolar electrode according to the present invention to a rigid plate and a non-graphitic carbon/plastic formulation, with respect to change in length.

FIG. 4 is a flowchart illustrating the manufacturing process for bipolar electrodes according to the present invention.

DESCRIPTION OF THE INVENTION

In accordance with the invention, a pressure-molded bipolar electrode element is provided which is a composite of heat treated electrically conductive graphite particles and thermoplastic resin particles, in a weight ratio of from 1:5 to 1:1. The bipolar element is characterized by improved chemical stability to conditions within an electrochemical cell, particularly within zinc bromide electrochemical cell. This has improved stability as manifested by chemical stability in polybromide oil utilized in a zinc bromide cell, as for example, described in U.S. Pat. No. 4,162,351. At a temperature of 60° C. upon immersion into this oil for 1600 hours, the electrodes according to the present invention are characterized by less than 4.0% weight loss and less than 0.1% dimensional increase in length.

The bipolar electrodes according to the present invention also are characterized by excellent physical strength and chemical characteristics for an electrochemical cell. In particular the bipolar electrodes are characterized, after immersion in polybromide oil at 60° C. for 2300 hours, resistivity of less than 0.8 ohm-cm, and a flexural strength of at least 2400 psi.

One component of the bipolar electrodes according to the present invention is graphite having a particle size distribution of 0 to 45 $\mu$m. The graphite is also heat treated at a temperature of at least 800° C. for 2 hours prior to being processed into a composite. It is critical that the graphite have the above characteristics and be heat treated in order to obtain the proper chemical, electrical and physical characteristics in accordance with the invention. Graphite meeting the above characteristics of particle size distribution is available commercially from Asbury Graphite Mills, Inc. (Asbury, N.J.).

The thermoplastic resin particles may be any thermoplastic fluoropolymer, and in particular a polyvinylidene difluoride. Fluoropolymer resins such as tetrafluoropolyethylene, and the like, are commercially available and may be utilized in place of polyvinylidene difluoride although the polyvinylidene difluoride is preferable. A suitable polyvinylidene difluoride is available under the trade same Kynar, from PennWalt Corporation. The particle size distribution of the thermoplastic resin particles is also critical, and have a particle size distribution in the range of about 0 to 45 $\mu$m.

Typically the heat treated graphite particles will be dry mixed with the thermoplastic resin particles and compression molded into a composite under 400 kg/cm$^2$ or higher pressure at 190° C. with gradual cooling. Other alternate and preferred embodiments for preparing the electrodes will be described hereinbelow in connection with FIG. 4.

The composite will contain graphite particles and resin particles in the weight ratio of 1:5 to 1:1. The preferred weight ratio is 1:1.

In one embodiment of the present invention, the bipolar electrode may be formed into an assembly with a composite carbon felt. The carbon felt will be held in interfacial contact with the bipolar electrode by an adhesive material which is stable to the conditions within the electrochemical cell. Preferably this adhesive will comprise carbon (carbon black or graphite), polyvinylidene difluoride resin and dimethylformamide. Carbon black is the preferred carbon in the adhesive. The composite carbon felt will be attached to the positive face of the bipolar electrode with the electrically conductive adhesive material. The attachment of this felt improves the performance over a loose assembly of the felt and the bipolar electrode.

While not intending to be limited by any particular theory, it is believed that the bipolar electrodes made in accordance with the present invention with the above described graphite, exhibit a lower surface area than, for instance, an electrode made with carbon black and therefore exhibits less of a tendency for bromine absorption. Furthermore, it is believed that the thermoplastic resin shields the graphite particles from the effect of bromine and is heat resistant.

Further detail of preferred embodiments of the invention will be described in connection with the attached figures Referring to FIG. 1 there is shown a schematic exploded view diagram of a cell component of an electrochemical battery for use of zinc bromide technology. Frame 10 is a typical flow frame showing the positive side of the frame which is utilized to hold cell components. Flow frame 10 is usually made from heat and chemical resistant injection molded material such as polypropylene. Bipolar electrodes 12A and 12B are plates made in accordance with the present invention. Bonded to plate 12A is a carbon felt cathode substrate 14. The assembly of the bipolar electrode 12A and carbon felt cathode substrate 14 comprises a preferred assembly according to the present invention. Adjacent to the carbon felt 14 is the catholyte flow. Then partially shown is a filled gasket 16 area of the separator followed by the separator membrane 18. Bonded to separator membrane 18 is the anode grid spacer 20, which is adjacent to a space for the flow of anolyte. Finally, there is the bipolar electrode 12B for the next adjacent cell, with the cell stack continuing, depending upon the number of cells desired in the battery stack.

The carbon felt cathode substrate 14 is an open structure which allows flowthrough of the catholyte.

Preferably the felt will be about 97% porous. It has been found than an effective mean pore diameter in the felt of about 86 microns is preferable with a preferred range of porosity being 88% pores distributed between 10 and 70 microns.

Referring to FIG. 2 there is shown a graph of the results of an accelerated chemical stability test of three composite materials (molded 15 inch by 15 inch pieces): a rigid carbon/carbonized resin plate (represented by square data points) consisting of a sheet of phenolic resin heat treated to form a vitreous carbon; a plate formed by compression molding a mixture of 60% by weight Kynar and 40% by weight carbon black (data points represented by circles); and a plate according to the present invention formed from compression molding a mixture of 50% by weight Kynar and 50% by weight graphite having the characteristics as described herein (datapoints represented by triangles).

The three plates were immersed in 60° C. polybromide oil (a quaternary ammonium bromide salt used to complex bromide in zinc bromide cells) at 60° for 1600 hours. The increase in weight of each of the plates in terms of weight percentage is shown versus exposure time. The plate made in accordance with the present invention exhibited a less than 4% increase in weight indicating an improved weight stability.

Referring to FIG. 3 there is shown a graph of accelerated chemical stability of the same three plates as described in connection with FIG. 2 under the same conditions except that changes in the length of the samples are compared. The electrode made in accordance with the present invention (data points represented by triangles) exhibited less than a 0.1% dimensional increase in length, indicating improved dimensional stability.

Referring to FIG. 4 there is illustrated a flowchart of the preferred manufacturing processes preparing bipolar electrodes according to the present invention. In one embodiment the graphite is first subjected to the step of heat treatment 30 at a temperature of at least 800° C. for a period of at least 2 hours. Then the heat treated graphite is subjected to the step 32 of screening to ensure the particle size distribution of 0 to 45 μm. The graphite is then dry mixed in step 34 with the appropriate amount of the thermoplastic resin particles. The mixture is then screened in step 36 to ensure that the resin particles in the mixture are within the size distribution range of 0 to 45 μm. The dry blend of graphite and resin is then compression molded in step 38 under pressure of at least 400 kg/cm² at 190° C. with cooling in a conventional compression mold apparatus.

In a second embodiment, referring to FIG. 4, in the dry mixing step 34 a small amount of a binder material is added to the dry mix. Preferably this will be a perfluorinated polymer material, preferably Teflon ®. This will be added in an amount of about 2 weight percent of the total mixture. After screening in step 36 the dry blend is then wet mixed with a hydrocarbon carrier, such as Solvent 340 (Shell) in step 40 then calendered into sheets in step 42. The sheets are then dried in step 44 and submitted to the compression molding step 38 as described above. In this embodiment, by loading the mold with a preform calendered sheet, the material uniformity over the area of the electrode is improved and the inclusion of airborne particulates in the composite is reduced.

The following example is provided by way of illustration and is not intended to limit the invention in any way.

EXAMPLE

A mixture of 250 gms of polyvinylidene difluoride, sold under the trade name of Kynar by the PennWalt Corporation and 250 gms of a graphite, (artificial), sold under the name A-99, by Asbury Graphite Mills, Inc., having been pretreated at 800° C. in air for 2 hours, were dry mixed. The graphite was previously screened through a 325 mesh screen to ensure the particle size distribution of 0 to 45 μm. To the dry mixture of graphite and polyvinylidene difluoride resin was added 8 gms of particulate Teflon ®. The dry mixture containing these three components was screened through a 20 mesh screen then mixed with 250 ml of Shell Solvent 340 as a hydrocarbon carrier. The wet mixture was calendered between rollers to form sheets. The sheets were dried at 20° C. for 168 hours then placed into a compression mold and molded into 15×15 inch plates under 400 kg/cm² pressure at 190° C. The mold was gradually cooled during compression. The formed plates had a compressed thickness of 40 mils.

We claim:

1. A bipolar electrode element for electrochemical cells comprising:
   a pressure-molded composite of heat-treated electrically conductive graphite particles having a particle size distribution before molding of 0 to 45 μm, said graphite being heat-treated at a temperature of at least 800° C. in air for 2 hours prior to forming said composite; and thermoplastic fluoropolymer resin particles having a particle size distribution before molding of 0 to 45 μm, said graphite and said resin in said composite being in a weight ratio of from 1:5 to 1:1; said composite characterized by less than 4.0% weight loss and less than 0.1% dimensional increase in length upon immersion at 60° C. into polybromide oil for 1600 hours; and said composite being formed by pressure-molding a mixture comprising said graphite and said resin at 400 kg/cm² or above at 190° C.

2. A bipolar element according to claim 1 characterized by a resistivity of less than 0.8 ohm-cm and a flexural strength of at least 2400 psi upon immersion at 60° C. into polybromide oil for at least 2300 hours.

3. A bipolar element according to claim 1 further comprising up to 2% by weight of a perfluorohydrocarbon wherein said graphite, said resin and said perfluorohydrocarbon are calendered with a hydrocarbon carrier into preformed shapes prior to being subjected to said pressure molding.

4. A bipolar element according to claim 3 wherein said perfluorohydrocarbon comprises polytetrafluoroethylene.

5. A bipolar element according to claim 1 wherein said thermoplastic resin comprises polyvinylidene difluoride.

6. A bipolar element according to claim 5 wherein said graphite and said resin in said composite are in a weight ratio of 1:1.

7. A bipolar assembly comprising a bipolar element according to claim 1 and a composite carbon felt, said felt and said element being held in interfacial contact with an adhesive.

8. A bipolar assembly according to claim 7 wherein said adhesive is formed from carbon, polyvinylidene difluoride resin and dimethylformmide.

9. A method of making a bipolar element for electrochemical cells comprising the steps of:
   (a) dry mixing electrically conductive graphite particles with thermoplastic resin particles, said graphite particles having a particle size distribution of 0 to 45 μm, said graphite further being heat-treated at a temperature of at least 800° in air for 2 hours; said graphite and said resin being in a weight ratio of from 1:5 to 1:1, with up to 2% by weight of a perfluorohydrocarbon binder;
   (b) screening the mixture from step (a) to form a particulate mixture of average particle size of 0 to 45 μm;
   (c) forming a wet mixture of the particulate mixture from step (b) with a liquid hydrocarbon carrier and calendering said wet mixture into sheets;
   (d) drying said sheets from step (c);
   (e) compression molding said sheets from step (d) under a pressure of at least 400 kg/cm² at 190° C. to form said bipolar elements.

10. A method according to claim 9 wherein said perfluorohydrocarbon in step (a) comprises polytetrafluoroethylene.

11. A method according to claim 9 wherein said thermoplastic resin comprises polyvinylidene difluoride.

12. A method of making a bipolar element for electrochemical cells comprising the steps of:

(a) dry mixing electrically conductive graphite particles and thermoplastic resin particles, said graphite having a particle size distribution of 0 to 45 $\mu$m, said graphite further being heat-treated at a temperature of at least 800° C. for 2 hours; said graphite and said resin being in a weight ratio of from 1:5 to 1:1;

(b) screening the mixture from step (a) to form a particle mixture of average particle size of 0 to 45 $\mu$m;

(c) compression molding said mixture from step (b) under a pressure of at least 400 kg/cm$^2$ at 190° C. to form said bipolar element.

13. A method according to claim 12 wherein said thermoplastic resin particles comprise polyvinylidene difluoride.

* * * * *